United States Patent Office 3,061,658
Patented Oct. 30, 1962

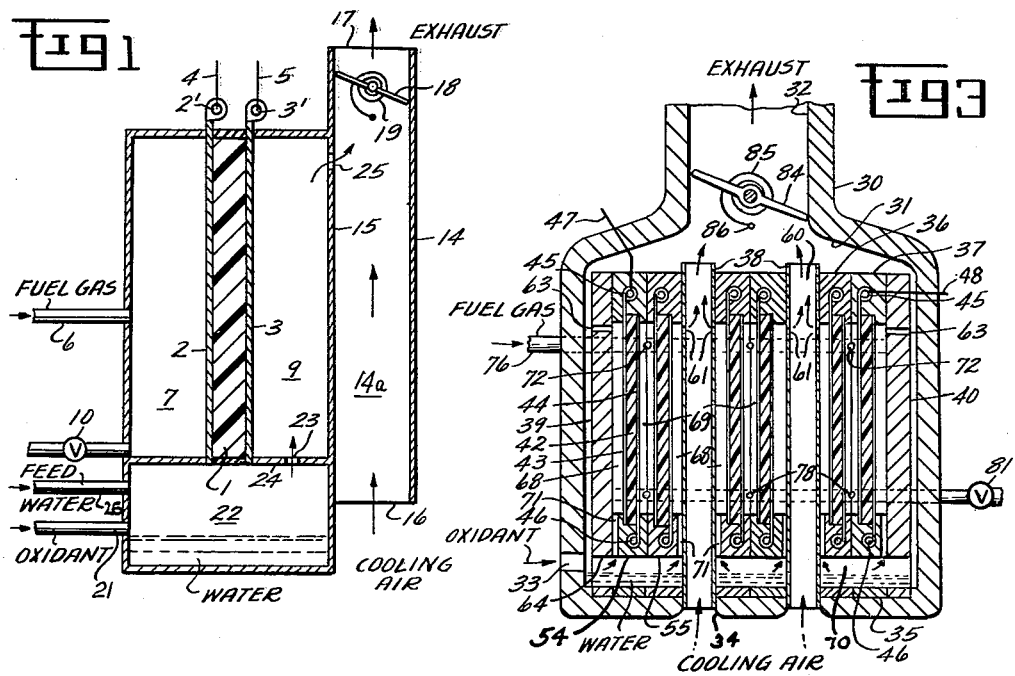
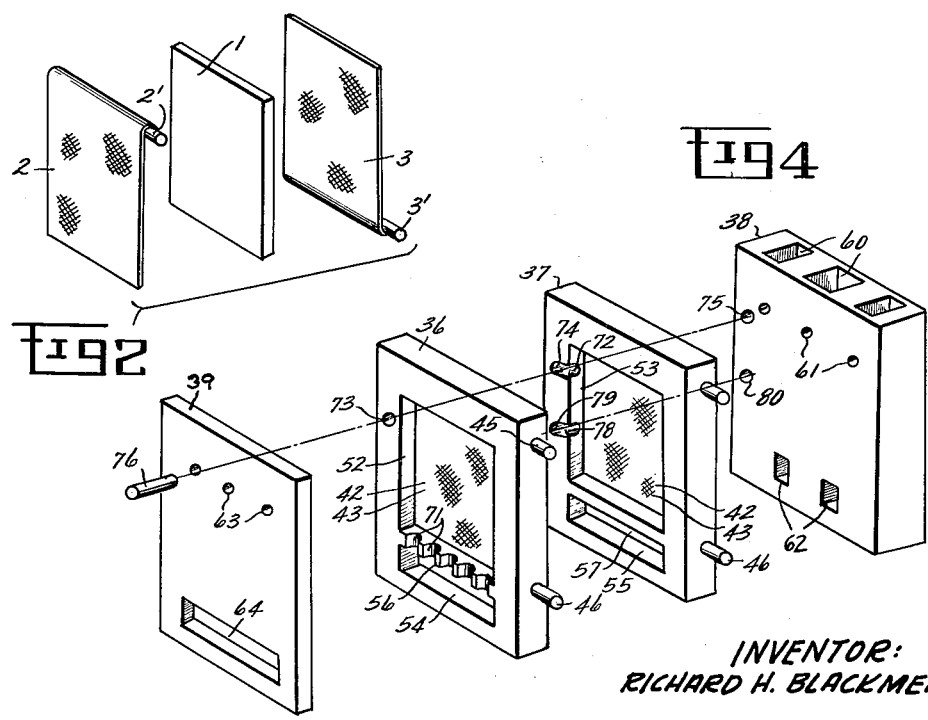

3,061,658
FUEL CELL CONSTRUCTION
Richard Hardin Blackmer, Topsfield, Mass., assignor to General Electric Company, a corporation of New York
Filed Dec. 31, 1959, Ser. No. 863,263
14 Claims. (Cl. 136—86)

This invention relates to a fuel cell construction, and more particularly to an improved construction of a fuel cell of the type shown and described by U.S. Patent No. 2,913,511 to Willard T. Grubb, Jr., issued November 17, 1959, and assigned to the assignee of this application.

A fuel cell having a solid ion exchange electrolyte membrane is disclosed by the aforementioned Grubb patent, and this type of cell will hereinafter be referred to as a "solid electrolyte fuel cell" for convenience. According to the patent, an ion exchange resin membrane is placed between and in contact with a pair of permeable electrodes having catalytic properties, which are exposed to reactants comprising an oxidant and a fuel gas, for example, hydrogen. Ionization of one of the reactants occurs at one of the electrodes; electrons migrate between the electrically-connected electrodes to establish an electric current output, and the ions migrate through the membrane to combine with the other reactant at the second electrode.

As a general rule, ion exchange resins are formed in aqueous solutions or emulsions of various types of organic compounds so that when the membrane is formed it is substantially saturated with water. In this form the resin is described as being hydrated. The term "hydrated" means that the resin contains enough water to be substantially saturated, but not necessarily wet. The amount of water in a hydrated ion exchange resin may vary within wide limits depending on the particular composition of the resin and its physical structure. Generally, the hydrated resins employed in a solid electrolyte fuel cell contain from about 15 to 50 percent, by weight, of water held in the resin by secondary Van der Waals forces. This water of hydration cannot be removed from the resin by mechanical forces.

However, I have found that when atmospheric air is used as the oxidant, the resin membrane tends to dehydrate, which causes it to shrink and crack. This effect is especially pronounced under conditions of low atmospheric humidity. Dehydration interferes with proper operation of the fuel cell, and results in catastrophic failure of the membrane if allowed to proceed for a period of time. The resulting leakage of the fuel gas through the membrane and into direct contact with the air can be expected to result in fire or explosion. The same effect occurs when dry oxygen is utilized as the oxidant gas.

The dehydration effect proceeds even more rapidly where the resin membrane is exposed to a rate of air flow in excess of that required for the cell reaction. At the same time, excess air flow is desirable for cooling of the membrane, in which heat is generated by the cell reaction. In practice, I have found that the rate of air flow required for effective cooling may be many times that required to carry out the cell reaction, depending upon the ambient atmospheric temperature.

It is an object of my invention to provide a solid electrolyte fuel cell construction with means to prevent dehydration of an ion exchange resin membrane thereof.

It is a further object of my invention to provide a solid electrolyte fuel cell construction with means for fluid-cooling an ion exchange resin membrane thereof, which means minimize dehydration of the membrane.

It is a further object of my invention to provide a solid electrolyte fuel cell construction with means for inducing fluid flow therethrough by natural convection, for use as a coolant and as a reactant, which means minimize dehydration of a membrane of the cell.

It is still a further object of my invention to provide a fuel battery construction comprising a plurality of solid electrolyte fuel cells electrically connectable in series or in parallel, with means for carrying out the foregoing objects.

Further objects and advantages of my invention will become apparent as the following description proceeds.

Briefly stated, according to one embodiment thereof, I carry out my invention by providing a fuel cell construction with means for segregating a stream of cooling fluid from a stream of reactant air or oxidant, and with means for humidifying the reactant air or oxidant prior to passing it in contact with an ion exchange resin membrane of the fuel cell. Means are also provided for passing the segregated stream of cooling fluid in heat exchange relationship with the reactant air, to cool the membrane without dehydration by the cooling fluid. The reactant air stream is discharged from the fuel cell and combined with the cooling fluid stream at a point vertically elevated from the point of intake, so that the desired flows are established by natural convection.

In a further embodiment of my invention in a fuel battery comprising a plurality of individual electrically connected fuel cells, I carry out my invention by alternately stacking heat-exchange cooling fluid elements with units of one or two fuel cells, sandwich-fashion. The membranes of the fuel cells are supported in frame members, forming fluid-sealing chambers when stacked with the cooling air elements. Suitable conduits are provided in the frame members and cooling air elements for conducting fuel gas and reactant air to the appropriate chambers.

While the specification concludes with claims particularly pointing out and distinctly claiming the subject matter which I regard as my invention, it is believed that the invention will be better understood from the following detailed description thereof, taken in conjunction with the accompanying drawing, in which:

FIG. 1 is a schematic representation of a first embodiment of my invention, in a single fuel cell;

FIG. 2 is a pictorial view of terminal grid, electrode, and ion exchange membrane structures of the fuel cell;

FIG. 3 is an elevation in cross-section of a second embodiment of my invention, in a fuel battery comprising multiple fuel cells; and FIG. 4 is a pictorial view of frame members and air cooling elements of the fuel battery of FIG. 3.

Referring to FIG. 1, a fuel cell made according to the aforementioned Grubb Patent No. 2,913,511 is provided, comprising an ion exchange membrane 1 positioned between and in electrical contact with terminal grids 2 and 3. As best shown in FIG. 2, grids 2 and 3 are formed as screens of electrically conductive material, soldered along one edge to terminals 2' and 3', respectively. Alternatively, the grids may be formed of punched metal plates, of solid metal plates having surface projections, or in any manner which will permit gas to contact the membrane and also provide for electrical contact at spaced intervals between the grid and the membrane. Leads 4 and 5 connected to terminals 2' and 3', respectively, are used to deliver electrical current to apparatus supplied by the cell. Gas-permeable catalytic electrodes are provided over the major surfaces of membrane 1. The terminal grids 2 and 3 serve as electrodes, as shown, but the electrodes may alternatively be integrally bonded with the membrane, as described in copending application Serial No. 850,589 of Leonard W. Niedrach, filed November 3, 1959, and assigned to the assignee of the present application. Fuel gas is supplied to grid 2 and membrane 1 through conduit means 6 and chamber 7. A valved outlet 10 is provided from chamber 7 to exhaust any impurities which enter the chamber from the fuel gas or any inert materials which are a product of reaction of the fuel gas. Reactant oxidant gas, which may be oxygen or air, is admitted into chamber 9.

By way of example, the membrane 1 can be a cation permeable membrane, having $H^+$ ions as the mobile ion, and the fuel gas can be hydrogen. In this case the overall cell reaction is the oxidation of hydrogen to water. In this reaction, gaseous molecular hydrogen is ionized at grid 2, with hydrogen ions migrating to electrode 3 through membrane 1, and electrons migrating to electrode 3 through electrode 2 and an external load connected to leads 4 and 5. If membrane 1 is anion permeable, having mobile OH-ions, and the fuel gas is hydrogen, the overall cell reaction is again the oxidation of hydrogen to water. Again, where the fuel gas is a hydrocarbon such as methane, or is carbon monoxide, the overall cell reaction is the oxidation of the fuel gas to carbon dioxide and water.

Although each of these reactions involves the generation of water on the oxidant side of the membrane when membrane 1 is cation permeable, I have found in practice that this water is often ineffective to prevent dehydration of the membrane. The water appears on the surfaces of the electrode; some of it is swept away by the oxidant, and the remainder forms droplets which flow downwardly over the grid surfaces. Dehydration nevertheless occurs over the surfaces of the membrane exposed to the oxidant. In cells utilizing an anion permeable membrane, water is formed on the fuel gas side of the membrane, and dehydration proceeds even more rapidly.

According to my invention, dehydration of the membrane is prevented by segregating a fluid used for cooling purposes, from exposure to the membrane; and by humidifying the oxidant gas which is employed as a reactant by the fuel cell. Means are provided for producing flow of the streams of oxidant and cooling fluid by natural convection.

In the embodiment shown in FIG. 1, air is utilized as the cooling fluid. A heat exchanger cooling element 14 is provided, forming a cooling air passage 14a therethrough. Element 14 is suitably secured to a wall 15 partially enclosing chamber 9 of the fuel cell, for heat exchange with the chamber through the wall. A lower end 16 and an upper end 17 of element 14 form an inlet and outlet, respectively, to permit a flow of cooling air to pass through passage 14a. Heat received by the element from chamber 9 establishes a flow of cooling air, in the direction shown by the arrows, by means of natural convection. In order to regulate the temperature in chamber 9, and to prevent freezing of water formed therein, a thermostatically-controlled throttle valve 18 is mounted near the upper end of element 14, and is variably biased by thermostatic control means comprising a bimetallic spring 19, to maintain the temperature of the air flow within predetermined limits. Suitable means (not shown) are provided for locking valve 18 in the closed position when the fuel cell is not in operation, for preventing flow of oxidant through chamber 9.

Means for supplying oxidant to chamber 9 are provided, comprising inlet 21. A humidifying chamber 22 is placed in serial flow relation between inlet 21 and chamber 9, in order to humidify the flow of oxidant supplied to the fuel cell. Inlet 21 is spaced from the bottom of chamber 22 to provide for the accumulation of water therein. Fluid communicating means comprising an opening 23 are formed in a bottom wall 24 of chamber 9 for passage of oxidant from chamber 22 into chamber 9, and for passage of water generated by the fuel cell in the opposite direction. The generated water accumulates in the bottom of chamber 22. The oxidant gas, which may be atmospheric air or oxygen, is humidified in its passage over the surface of the water toward orifice 23. Alternatively, additional means (not shown) may be placed in chamber 22 to humidify the air more thoroughly; for example, the chamber may be filled with metallic sponge material. An additional conduit 26 is provided for supplying water or other humidifying agents to chamber 22 from an external source (not shown), under very dry atmospheric conditions in which the generated water is inadequate to humidify the oxidant gas sufficiently to prevent dehydration of membrane 1, and for use in fuel cells in which membrane 1 is anion permeable, generating water in chamber 7 only.

Flow of oxidant through chamber 9 is provided for by forming a metering orifice 25 in wall 15, near the upper end of the chamber. Heat absorption by the oxidant gas from the membrane establishes a flow of gas through the chamber in the direction shown by the arrows, induced by natural convection. Products of the cell reaction, including nitrogen in the event air is used as the oxidant, and evaporated water, are swept through orifice 25 with this flow, and fresh oxidant is continually supplied through orifice 23. Metering orifice 25 is sized to establish a desired flow rate of oxidant, to insure continued cell reaction without producing excessive cooling or freezing of the membrane. By way of example, I have found in practice that a rate of flow equal to about 200% of the stoichiometric quantity required for the cell reaction gives satisfactory performance.

Referring to FIGS. 3 and 4, a further embodiment of my invention in a fuel battery is shown, comprising a plurality of solid electrolyte fuel cells which are electrically connectable in a series or parallel arrangement. The battery includes a casing 30 of any material which is fluid-sealing and non-reactive with the fuel gas and oxidant, but I prefer to utilize a material having good thermal insulating and molding qualities, such as polyethylene, rubber, etc. The casing forms a battery enclosure 31, and an exhaust duct 32 at an upper end thereof. It is formed with an opening 33 for admission of oxidant, and a plurality of openings 34 for admission of cooling air. Opening 33 is spaced above the bottom surface 35 of enclosure 31, to provide for the accumulation of water in the enclosure, as shown. Excess water is permitted to drain outwardly through opening 33.

Within enclosure 31, I form a fuel battery by stacking a plurality of frames 36 and 37 alternately with a plurality of cooling air elements 38, in gas-sealing relationship. As shown, the ends of the stack are enclosed by means of plates 39 and 40; however, these may be replaced by additional cooling air elements if desired. Each of the frames is molded about a fuel cell unit, comprising an ion exchange membrane 42 placed between and in electrical contact with a pair of terminal grids 43 and 44, similar to that shown in FIG. 2. Frames 36 and 37 may be molded of any desired material which has sufficient strength to support membranes 42, is non-reactive with the fuel gas and oxidant, will form a gas-tight seal when stacked, and which will not dehydrate the membranes in the molding process. Examples of suitable materials include polyethylene, polystyrene, and phenolic resin. Grids 43 and 44 are soldered to terminals 45 and 46, respectively, and project from the frames for external electrical connection.

Frames 36 and 37 are molded to form recesses on either side of membranes 42 encased therein, and these are partially shown in FIG. 4 at 52 and 53, respectively. The frames are further formed with openings 54 and 55, respectively, near the bottom ends thereof; and with cross-members 56 and 57, respectively, encasing the lower ends of the grids and membranes.

Cooling air elements 38 are formed of any suitable material having good thermal conducting qualities, and otherwise meeting the previously-enumerated requirements for the material of the frames. Elements 38 are formed with a plurality of cooling air passages 60 extending vertically therethrough, and with a horizontally-extending series of metering orifices 61, each of which communicates with one of passages 60 near an upper end thereof. A plurality of openings 62 are formed near the bottom of the element for alignment with openings 54 and 55 of the frames, and are spaced intermediate openings 60 in such manner that they do not communicate therewith.

Each of end plates 39 and 40 is also formed near the upper end thereof with a horizontally-extending series of metering orifices 63, for communication with one of recesses 52 or 53. Near the lower end of each end plate, an opening 64 is formed for alignment with openings 54 and 55 of the frames, and openings 62 of the cooling elements.

Upon assembly of the frames, end plates, and cooling elements into the fuel battery, as shown in FIG. 3, recesses 52 and 53 of the frames cooperate with the end plates to form oxidant chambers 68 and fuel gas chambers 69 in an alternating series, spaced apart by membranes 42 to form a stacked series of individual fuel cells. It will be apparent that adjacent pairs of membrances 42 share a common fuel gas chamber 69 in this arrangement, and that each oxidant chamber 68 communicates with enclosure 31 through one of metering orifices 63, or one of metering orifices 61 and one of passages 60.

Openings 54, 55, 62, and 64 are aligned in the assembly to form a humidifying chamber 70. In order to supply oxidant to chambers 68 from opening 33 and chamber 70, conduit means comprising a series of grooved openings 71 are formed through that lateral edge of each of cross-members 56 and 57 which defines the lower end of a chamber 68. Water generated by the fuel cell reaction drains from chambers 68 downwardly into chamber 70, and may accumulate as shown to the level of opening 33, from which excess water is allowed to drain off. Under operating conditions such that additional feed water is required to adequately humidify the oxidant, or for use in a fuel battery having membranes 42 which are anion permeable, it may be supplied to chamber 70 through opening 33, or by other suitable conduit means. If desired, additional humidification means, such as metallic sponge material, may be placed in chamber 70.

Fuel gas is supplied to each of chambers 69 by means of a conduit 76 which communicates with aligned openings 73, 74, and 75 formed in frames 36 and 37 and elements 38, respectively, through a suitable opening (not shown) formed in end plate 39. Grooves 72 are formed in frames 36 and 37 for communication of openings 73 and 74 with chambers 69. Impurities and inert products of reaction of the fuel gas are removed from chambers 69 by means of a valved outlet conduit 81, which communicates with these chambers through grooves 78, openings 79, and openings 80 formed in frames 36 and 37 and elements 38, respectively, and a suitable aligned opening (not shown) in end plate 40.

Operation of the individual fuel cells of the fuel battery is identical with that of the fuel cell shown in FIG. 1. Terminals 45 and 46 of each cell are of opposite polarity (grids 43 and 44 situated in chambers 69 being negative, and those in chambers 68 being positive), and are connected by suitable conductors (not shown) in series or in parallel, as desired, to supply an electrical current output at leads 47 and 48. Cooling air is induced to flow through openings 34 and passages 60 in the directions shown by the arrows, in convection currents induced by heat received from the adjacent fuel cells. Flow of oxidant from humidification chamber 70 through openings 71 and chambers 68, and through metering orifices 61 into passages 60 in the directions shown by the arrows, occurs in convection currents induced in the same manner. The fuel cell chambers are thus continually supplied with fresh oxidant, and are cooled effectively by the cooling air flow.

Means similar to those of the fuel cell of FIG. 1 are provided for regulating the temperature of the fuel battery; these means comprise a throttle valve 84 pivotally mounted in exhaust duct 32, and variably biased by thermostatic control means comprising a bimetallic spring 85 which is secured at one end in duct 32 by a pin 86. The temperature of the exhaust gas flow is thus maintained within predetermined limits. Again, suitable means (not shown) are provided for locking valve 84 in the closed position when the fuel battery is not in operation, thus preventing flow of oxidant through chambers 68.

It will be apparent from the foregoing description that I have provided a construction of a solid electrolyte fuel cell or battery which affords improved cooling of one or more ion exchange resin membranes in the cell or battery of cells, and which also affords improved means for preventing dehydration of the membranes. While I have shown and described particular embodiments of my invention, it will be apparent to those skilled in the art that various changes and modifications may be made without departing from the spirit and scope of the invention.

What I claim and desire to secure by Letters Patent of the United States is:

1. In a fuel cell having a pair of electrodes and an ion exchange resin membrane positioned between and in contact with said electrodes, the improvement, comprising: means for supplying fuel gas to a first one of said electrodes, means for supplying oxidant to a second one of said electrodes including a humidification chamber, and means for supplying water to said chamber to humidify the oxidant supplied to said second electrode.

2. In combination with a fuel cell comprising a pair of electrodes and an ion exchange resin membrane positioned between and in contact with said electrodes, means for supplying fuel gas to a first one of said electrodes, inlet means for supplying oxidant to a second one of said electrodes including a humidification chamber, means for supplying water to said chamber to humidify the oxidant supplied to said second electrode, and a heat exchanger element formed with a cooling fluid passage having an inlet and an outlet for receiving and discharging a stream of cooling fluid, said outlet vertically elevated from said inlet, said element in heat exchange relationship with said oxidant for establishing a convection current of ambient air through said passage to cool said oxidant.

3. The combination recited in claim 2, said second electrode being in fluid communication with said passage through a metering orifice formed in said element at a higher elevation than said inlet, such that a convection current of oxidation is established from said humidification chamber to said second electrode and to said passage in serial flow relation.

4. The combination recited in claim 3, together with a throttle valve positioned in said passage at a higher elevation than said metering orifice, and thermostatic control means operatively connected to said throttle valve for regulation of the rate of flow of the stream of cooling fluid through said passage to regulate the temperature of said second electrode.

5. In combination with a fuel cell comprising a pair of electrodes, an ion exchange resin membrane positioned between and in contact with said electrodes, a first chamber enclosing a first one of said electrodes, and a second chamber enclosing a second one of said electrodes; means for supplying fuel gas to said first chamber, said second chamber formed with an opening, and means for supplying humidified oxidant to said second chamber through said opening, said second chamber formed with a metering orifice communicating with the exterior thereof at a higher elevation than said opening for establishing a convection current of oxidant through said opening to said second chamber and said metering orifice.

6. The combination recited in claim 5, together with a heat exchanger element formed with a vertically-extending cooling fluid passage for receiving and discharging a stream of cooling fluid, said element in heat exchange relationship with said second chamber for establishing a convection current of cooling fluid through said passage to cool said second chamber, said metering orifice communicating with said passage for discharge thereto of said convection current of oxidant.

7. In combination with a fuel cell comprising a pair of electrodes, an ion exchange resin membrane positioned between and in contact with said electrodes, a first chamber enclosing a first one of said electrodes, and a second chamber enclosing a second one of said electrodes; means for supplying fuel gas to said first chamber, said second chamber formed with an opening, means including a humidification chamber for supplying oxidant to said second chamber through said opening, and means for supplying water to said humidification chamber to humidify the oxidant supplied to said second chamber, said second chamber formed with a metering orifice communicating with the exterior thereof at a higher elevation than said opening for establishing a convection current of oxidant from said humidification chamber through said opening, said second chamber, and said metering orifice.

8. The combination recited in claim 7, together with a heat exchanger element formed with a vertically-extending cooling air passage for receiving and discharging a stream of ambient air, said element in heat exchange re-relationship with said second chamber for establishing a convection current of ambient air through said passage to cool said second chamber, said metering orifice communicating with said passage for discharge thereto of said convection current of oxidant.

9. A fuel battery comprising, in combination; a plurality of fuel cells each comprising a pair of electrodes and an ion exchange resin membrane positioned between and in contact with said electrodes, said electrodes adapted for selective electrical connection of said fuel cells, means for supplying fuel gas to one of said pair of electrodes of each fuel cell, means including a humidification chamber for supplying oxidant to a second of said pair of electrodes of each fuel cell, means for supplying water to said chamber to humidify the oxidant supplied to said second electrodes, and at least one heat exchanger element formed with a vertically-extending cooling air passage therethrough for receiving and discharging a stream of ambient air, said element arranged in stacked heat-exchanging relationship with said fuel cells for establishing a convection current of ambient air through said passage to cool said fuel cells.

10. A fuel battery comprising, combination: a pair of fuel cells each comprising a pair of electrodes, an ion exchange resin membrane positioned between and in contact with said electrodes, a first chamber enclosing a first one of said electrodes, and a second chamber enclosing a second one of said electrodes, said electrodes adapted for selective electrical connection of said fuel cells; means for supplying fuel gas to said first chamber of each of said fuel cells; each of said second chambers formed with an opening means for supplying oxidant to said second chamber of each of said fuel cells through said openings; and a heat exchanger element formed with a vertically-extending cooling air passage therethrough for receiving and discharging a stream of ambient air; said element arranged in stacked heat-exchanging relationship between said pair of fuel cells for establishing a convection current of ambient air through said passage to cool said fuel cells, said second chamber of each of said fuel cells being located adjacent to said element; said second chamber of each of said fuel cells being formed with a metering orifice communicating with said passage at a higher elevation than said opening for establishing a convection current of oxidant from said opening through said second chamber and said metering orifice of each of said fuel cells into said passage.

11. A fuel battery comprising, in combination: a pair of fuels cells each comprising a pair of electrodes and an ion exchange resin membrane positioned between and in contact with said electrodes, said electrodes adapted for selective electrical connection of said fuel cells; a pair of frames each formed with a recess therethrough receiving one of said pair of fuel cells; a pair of heat exchanger elements each formed with at least one vertically-extending cooling air passage therethrough for receiving and discharging a stream of ambient air; said pair of frames arranged in stacked heat-exchanging relationship between said pair of elements; said frames and said recesses therein forming a first chamber between said frames and said fuel cells, and forming a pair of second chambers between said fuel cells and adjacent ones of said pair of elements; means for supplying fuel gas to said first chamber; and conduit means for supplying oxidant to said pair of second chambers; said fuel battery operative to establish a convection current of ambient air through said passages to cool said fuel cells.

12. A fuel battery as recited in claim 11, said elements each formed with a metering orifice communicating said passage therein with an adjacent one of said pair of second chambers at a higher elevation than said conduit means for establishing convection currents of oxidant from said conduit means through said pair of second chambers and said metering orifices into said passages of said elements.

13. A fuel battery as recited in claim 12, said frames formed with aligned openings at a lower elevation than said recesses, said openings forming a humidification chamber in said fuel battery in serial flow relation between said conduit means and said pair of second chambers, together with means for supplying water to said humidification chamber to humidify the currents of oxidant supplied to said pair of second chambers.

14. A fuel battery as recited in claim 13, together with a casing enclosing said fuel battery, said casing formed with an exhaust duct for discharging the streams of cooling air and oxidant from said passages, a throttle valve positioned in said exhaust duct, and thermostatic control means operatively connected to said throttle valve for regulation of the rate of flow of the streams of cooling air and oxidant through said fuel battery to regulate the temperature thereof.

References Cited in the file of this patent

UNITED STATES PATENTS

| | | |
|---|---|---|
| 2,510,262 | Solner et al. | June 6, 1950 |
| 2,913,511 | Grubb | Nov. 17, 1959 |